(12) United States Patent
Liang (10) Patent No.: US 10,313,712 B2
(45) Date of Patent: Jun. 4, 2019

(54) METHOD, DEVICE, AND SERVER FOR PRODUCING VIDEO FRAME SET

(71) Applicant: GUANGZHOU UCWEB COMPUTER TECHNOLOGY CO., LTD., Guangzhou, Guangdong (CN)

(72) Inventor: Jie Liang, Guangzhou (CN)

(73) Assignee: Guangzhou UCWeb Computer Technology Co., Ltd., Guangzhou, Guangdong (CN)

( * ) Notice: Subject to any disclaimer, the term of this patent is extended or adjusted under 35 U.S.C. 154(b) by 11 days.

(21) Appl. No.: 15/522,546

(22) PCT Filed: Aug. 10, 2015

(86) PCT No.: PCT/CN2015/086493
§ 371 (c)(1),
(2) Date: Apr. 27, 2017

(87) PCT Pub. No.: WO2016/065972
PCT Pub. Date: May 6, 2016

(65) Prior Publication Data
US 2017/0318317 A1 Nov. 2, 2017

(30) Foreign Application Priority Data
Oct. 31, 2014 (CN) .......................... 2014 1 0610673

(51) Int. Cl.
*H04N 21/44* (2011.01)
*H04N 21/2387* (2011.01)
(Continued)

(52) U.S. Cl.
CPC ... *H04N 21/23418* (2013.01); *H04N 21/2387* (2013.01); *H04N 21/23424* (2013.01);
(Continued)

(58) Field of Classification Search
CPC ......... H04N 21/23418; H04N 21/2402; H04N 21/44; H04N 21/2387; H04N 21/4343
(Continued)

(56) References Cited

U.S. PATENT DOCUMENTS 5,687,275 A * 11/1997 Lane .................. G11B 15/1875
348/E5.007
6,377,748 B1 * 4/2002 Schultz ................ G11B 27/005
375/E7.094
(Continued)

FOREIGN PATENT DOCUMENTS

CN 101783915 A 7/2010
CN 101901619 A 12/2010
(Continued)

OTHER PUBLICATIONS

International Search Report and Written Opinion for Application No. PCT/CN2015/086493, dated Oct. 29, 2015, 9 pages.
(Continued)

*Primary Examiner* — Thai Q Tran
*Assistant Examiner* — Jose M Mesa
(74) *Attorney, Agent, or Firm* — Sheppard Mullin Richter & Hampton LLP (57) ABSTRACT

Disclosed are a method, device, and server for producing a video frame set. The method comprises: compiling statistics on the degree of playback intensity of each video frame in a video, selecting at least one "selected video frame" from the video on a basis of the degree of playback intensity, where the degree of playback intensity of the video frame is a ratio between the number of times that the video frame is played back and the number of times the video is played back; and then, splicing the "selected video frames" to form a video frame set. The present embodiment selects the "selected video frames" on a basis of the degree of playback
(Continued)

intensity of the video frames in the video, and splices together the video frames so selected to form a video frame set, thus allowing video contents considered to be highlights by a majority of users to be spliced into the video frame set.

25 Claims, 4 Drawing Sheets

(51) Int. Cl.
      *H04N 21/8549*     (2011.01)
      *H04N 21/234*     (2011.01)
      *H04N 21/24*     (2011.01)
      *H04N 21/434*     (2011.01)

(52) U.S. Cl.
      CPC ..... *H04N 21/2402* (2013.01); *H04N 21/2407* (2013.01); *H04N 21/4343* (2013.01); *H04N 21/44* (2013.01); *H04N 21/8549* (2013.01)

(58) Field of Classification Search
      USPC .......................................................... 386/241
      See application file for complete search history.

(56) References Cited

U.S. PATENT DOCUMENTS

| | | | |
|---|---|---|---|
| 9,542,976 B2* | 1/2017 | Sipe | ........................ G11B 27/11 |
| 2012/0321277 A1 | 12/2012 | Lee | |
| 2013/0223537 A1 | 8/2013 | Kasai et al. | |
| 2015/0364159 A1 | 12/2015 | Ushiyama | |
| 2016/0277779 A1 | 9/2016 | Zhang et al. | |

FOREIGN PATENT DOCUMENTS

| | | |
|---|---|---|
| CN | 102447973 A | 5/2012 |
| CN | 103190156 A | 7/2013 |
| CN | 103634605 A | 3/2014 |
| CN | 103957433 A | 7/2014 |
| WO | 2014/132987 A1 | 9/2014 |

OTHER PUBLICATIONS

First Office Action for Chinese Application No. 201410610673.9, dated Jul. 6, 2016, (with English Translation), 12 pages.
Second Office Action for Chinese Application No. 201410610673.9, dated Sep. 21, 2016, (with English Translation), 11 pages.
Third Office Action for Chinese Application No. 201410610673.9, dated Jan. 16, 2017, (with English Translation), 8 pages.
PCT International Preliminary Report on Patentability dated May 11, 2017, issued in related International Application No. PCT/CN2015/086493 (12 pages).
Qian Wu et al., "Brief Analysis of Video Abstract Technology", *Journal of Communication University of China* (Natural Science and Technology Edition), vol. 15, No. 2, Jun. 2008, (10 pages).
First Search dated Jun. 28, 2016, issued in related Chinese Application No. 2014106106739 (2 pages).

\* cited by examiner

METHOD, DEVICE, AND SERVER FOR PRODUCING VIDEO FRAME SET

CROSS-REFERENCE TO RELATED APPLICATIONS

This application is a national phase application of International Application No, PCT/CN2015/086493, filed on Aug. 10, 2015, which claims priority to and benefits of Chinese Patent Application No. 201410610673.9, filed with the Chinese Patent Office on Oct. 31, 2014 and entitled "METHOD AND DEVICE FOR PRODUCING VIDEO FRAME SET". The contents of the above-referenced applications are incorporated herein by reference in their entirety.

TECHNICAL FIELD

The present invention relates to the field of Internet, and in particular, to a method, device, and server for producing a video frame set.

BACKGROUND ART

With the development of networks, there are a huge quantity of various video resources (such as TV plays, movies, and variety shows), and a video website generally integrates hundreds and thousands of video resources.

The playback time of a common variety show is generally longer than 2 hours. The playback time of a TV play is even longer.

For users, they may only care about highlights in videos, and a lot of time will be wasted if overall contents of the videos are viewed.

To save the time of viewing videos by the users, some video resource providers provide video highlights (highlighted video frame sets), such as a highlighted trailer of a movie and a highlighted trailer of an episode of a TV play, to attract the users' attention. The video resource providers extract, from the whole video resources, video segments that are considered to be highlights based on their own knowledge and understanding, and then integrate them into such video highlights.

However, such video highlights are fixed, and are video highlights from the perspective of the providers, which cannot truthfully embody video highlights from the perspective of the users, and a problem that the users may miss watching video highlights considered by a majority of users arises.

SUMMARY

A technical problem to be solved by the present invention is to provide a method, device, and server for producing a video frame set, which can splice video contents, in an initial video (also referred to as an "original video"), considered as highlights by a majority of users into a video frame set.

According to one aspect of the present invention, a method for producing a video frame set is provided, including: compiling statistics on a degree of playback intensity of each video frame in a video; selecting at least one selected video frame from the video on a basis of the degree of playback intensity, where the degree of playback intensity of the video frame is a ratio between the number of times that the video frame is played back and the number of times the video is played back; and splicing the selected video frames to form the video frame set.

Preferably, the method may further include: recording a time stamp of the selected video frame in the video.

Preferably, the step of selecting at least one selected video frame from the video includes: screening intensively played-back video frames of which the degrees of playback intensity are greater than a predetermined threshold, and forming at least one intensively played-back video segment with the screened intensively played-back video frames; and extracting a selected video frame from the at least one intensively played-back video segment, where, the consecutive intensively played-back video frames form an intensively played-back video segment.

Preferably, the step of selecting at least one selected video frame from the video may further include: determining the number of selected video frames to be extracted from each intensively played-back video segment.

Preferably, the step of determining the number of selected video frames to be extracted from each intensively played-back video segment includes: calculating an average degree of playback intensity of all video frames in each intensively played-back video segment; calculating a proportion of video frames, of which the degrees of playback intensity are greater than or equal to the average degree of playback intensity, in each intensively played-back video segment; and determining, according to the proportion, the number of selected video frames to be extracted from each intensively played-back video segment.

Preferably, the step of determining, according to the proportion, the number of selected video frames to be extracted from each intensively played-back video segment includes: gradually reducing, according to the proportion from large to small, the number of selected video frames extracted from each intensively played-back video segment. The number of selected video frames extracted from an intensively played-back video segment having a greater proportion is greater than or equal to the number of selected video frames extracted from an intensively played-back video segment having a smaller proportion.

Preferably, when the number of actual video frames in an intensively played-back video segment is less than the determined number of selected video frames to be extracted from the intensively played-back video segment, all video frames in the intensively played-back video segment are extracted.

Preferably, the step of determining the number of selected video frames to be extracted from each intensively played-back video segment includes: determining the length of each intensively played-back video segment, that is, the number of video frames included in each intensively played-back video segment; and determining, according to the length of each intensively played-back video segment, the number of selected video frames to be extracted from each intensively played-back video segment.

Preferably, the step of determining, according to the length of each intensively played-back video segment, the number of selected video frames to be extracted from each intensively played-back video segment includes: gradually reducing, according to the length of each intensively played-back video segment from long to short, the number of selected video frames extracted from each intensively played-back video segment. The number of selected video frames extracted from an intensively played-back video segment having a longer length is greater than or equal to the number of selected video frames extracted from an intensively played-back video segment having a shorter length.

Preferably, when the number of actual video frames in each intensively played-back video segment is less than the number of the extracted selected video frames, all video frames in the intensively played-back video segment are extracted, and all the video frames are used as the number of the extracted selected video frames; or When the number of actual video frames in each intensively played-back video segment is greater than or equal to the number of the extracted selected video frames, consecutive frames in each intensively played-back video segment are extracted randomly, and the consecutive frames are used as the number of the extracted selected video frames.

Preferably, the step of splicing the selected video frames to form the video frame set includes: arranging the extracted selected video frames gradually according to the number thereof from more to less; where, the selected video frames in a same intensively played-back video segment are arranged according to a playback time sequence thereof in the video.

Preferably, in the step of extracting selected video frames from at least one intensively played-back video segment, a predetermined number of video frames are extracted from each intensively played-back video segment; or all video frames are extracted from each intensively played-back video segment.

Preferably, in the step of extracting selected video frames from at least one intensively played-back video segment, selected video frames are extracted randomly from each intensively played-back video segment; or several video frames before a video frame having the maximum degree of intensity in each intensively played-back video segment are extracted as selected video frames.

Preferably, the step of selecting at least one selected video frame from the video includes: selecting the first predetermined number of video frames among the video frames having the maximum degrees of playback intensity as selected video frames.

Preferably, the step of splicing the selected video frames to form the video frame set includes: sequentially splicing the selected video frames according to a playback time sequence of the selected video frames in the video, to form the video frame set.

According to another aspect of the present invention, a device for producing a video frame set is provided, including: a statistic apparatus configured to compile statistics on a degree of playback intensity of each video frame in a video; a video frame selection apparatus configured to select at least one selected video frame from the video on a basis of the degree of playback intensity, where the degree of playback intensity of the video frame is a ratio between the number of times that the video frame is played back and the number of times the video is played back; and a splicing apparatus configured to splice the selected video frames to form the video frame set.

Preferably, the device may further include: a statistic apparatus configured to compile statistics on the degree of playback intensity; and/or a time stamp recording apparatus configured to record a time stamp of the selected video frame in the video.

Preferably, the video frame selection apparatus may include: a video frame screening apparatus configured to screen an intensively played-back video frame of which the degree of playback intensity is greater than a predetermined threshold, and form at least one intensively played-back video segment with the screened intensively played-back video frames, where the consecutive intensively played-back video frames form an intensively played-back video segment; and a video frame extraction apparatus configured to extract a selected video frame from the at least one intensively played-back video segment.

Preferably, the video frame selection apparatus may further include: a frame number determination apparatus configured to determine the number of selected video frames to be extracted from each intensively played-back video segment.

Preferably, the frame number determination apparatus may include: an average degree of playback intensity calculation apparatus configured to calculate an average degree of playback intensity of all video frames in each intensively played-back video segment; a proportion calculation apparatus configured to calculate a proportion of video frames, of which the degrees of playback intensity are greater than or equal to the average degree of playback intensity, in each intensively played-back video segment; and a first frame number determination apparatus configured to determine, according to the proportion, the number of selected video frames to be extracted from each intensively played-back video segment.

Preferably, the first frame number determination apparatus is specifically configured to gradually reduce, according to the proportion from large to small, the number of selected video frames extracted from each intensively played-back video segment. That is, more selected video frames are extracted from an intensively played-back video segment having a larger proportion and fewer selected video frames are extracted from an intensively played-back video segment having a smaller proportion.

Preferably, the frame number determination apparatus may include: a video segment length determination apparatus configured to determine the length of each intensively played-back video segment, that is, the number of video frames included in each intensively played-back video segment; and a second frame number determination apparatus configured to determine, according to the length of the intensively played-back video segment, the number of selected video frames to be extracted from each intensively played-back video segment.

Preferably, the second frame number determination apparatus is specifically configured to gradually reduce, according to the length of each intensively played-back video segment from long to short, the number of selected video frames extracted from each intensively played-back video segment. More selected video frames are extracted from an intensively played-back video segment having a longer length and fewer selected video frames are extracted from an intensively played-back video segment having a shorter length.

According to another aspect of the present invention, a server is provided, including:

a transceiver configured to compile statistics on a degree of playback intensity of each video frame in a video; and a processor configured to select at least one selected video frame from the video on a basis of the degree of playback intensity, where the degree of playback intensity of the video frame is a ratio between the number of times that the video frame is played back and the number of times the video is played back; and splice the selected video frames to form a video frame set.

Preferably, selecting, by the processor, at least one selected video frame from the video includes: screening intensively played-back video frames of which the degrees of playback intensity are greater than a predetermined threshold; forming at least one intensively played-back video segment with the screened intensively played-back video frames; and extracting a selected video frame from the at least one intensively played-back video segment; where, the consecutive intensively played-back video frames form an intensively played-back video segment.

Preferably, selecting, by the processor, at least one selected video frame from the video may further include: determining the number of selected video frames extracted from each intensively played-back video segment.

Preferably, determining, by the processor, the number of selected video frames extracted from each intensively played-back video segment includes: calculating an average degree of playback intensity of all video frames in each intensively played-back video segment; calculating a proportion of video frames, of which the degrees of playback intensity are greater than or equal to the average degree of playback intensity, in each intensively played-back video segment; and determining, according to the proportion, the number of selected video frames extracted from each intensively played-back video segment.

Preferably, determining, by the processor, according to the proportion, the number of selected video frames extracted from each intensively played-back video segment includes: gradually reducing, according to the proportion from large to small, the number of selected video frames extracted from each intensively played-back video segment.

Preferably, determining, by the processor, the number of selected video frames extracted from each intensively played-back video segment includes: determining the length of each intensively played-back video segment; and determining, according to the length of each intensively played-back video segment, the number of selected video frames extracted from each intensively played-back video segment.

Preferably, determining, by the processor, according to the length of each intensively played-back video segment, the number of selected video frames extracted from each intensively played-back video segment includes: gradually reducing, according to the length of each intensively played-back video segment from long to short, the number of selected video frames extracted from each intensively played-back video segment.

The embodiments of the present invention further provide a computer readable storage medium, including a computer execution instruction, such that the computer performs all or a part of the steps of the method for producing a video frame set when a processor of the computer executes the computer execution instruction.

The present invention selects the selected video frames on the basis of the degree of playback intensity of the video frames in a video, and splices together the video frames so selected to form a video frame set, thus allowing video contents considered to be highlights by a majority of users to be spliced into the video frame set.

DETAILED DESCRIPTION

By using video highlights formed in this solution, video highlights from the perspective of users may be reflected. The formed video highlights may vary in real time according to playback situations of the users, and videos considered as the most highlighted by the users may be presented to other users, so that the users can view video highlights considered by a majority of users.

A method and device for producing a video frame set according to the present invention are described in the following with reference to the accompanying drawings.

Figure 1:
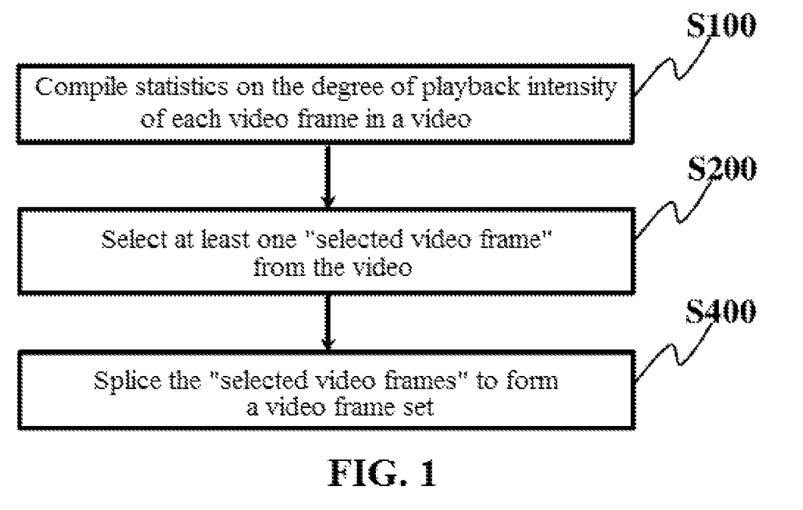
FIG. 1 is a flow chart of a method for producing a video frame set according to a first embodiment of the present invention.

FIG. 1 is a flow chart of a method for producing a video frame set according to a first embodiment of the present invention.

First, in step S100, statistics is compiled on a degree of playback intensity of each video frame in a video. The degree of playback intensity refers to a ratio between the number of times that the video frames are played back and the number of times the video is played back. For example, the number of times that the video frames are played back at a playback time stamp being 1:00:00 is 80, and the number of times the video is played back is 100, then, the degree of playback intensity of the video frame is 80%.

There are a variety of specific statistic manners, and one manner is used as an example in this embodiment, specifically including:

1) Playback information of a video is recorded by a video playback server.

In other words, when a user makes a request for playing back a video (that is, sends a video playback request), the video playback server records video frames viewed by the user, records that the video is played back once, and records that the viewed video frames are played back once.

The playback information may include: the number of times that each video frame is played back, the number of times the video is played back (which may be considered as the number of times that a link of the video is clicked for playback) and/or a time stamp of each video frame, and the like.

2) The degree of playback intensity of each video frame is calculated according to the recorded playback information.

After statistics on a certain number of video playback requests is compiled, the degree of playback intensity of each video frame is calculated according to the playback information on which statistics is compiled, so as to obtain a ratio between the number of times that the video frames are played back and the number of times the video is played back.

Statistics on the degree of playback intensity may be compiled by a video provider, and may also be compiled by another entrusted institution, or the degree of playback intensity may be acquired directly from another database.

However, the video provider generally has first-hand playback records, and thus the video provider can implement such statistics more accurately and quickly. The degree of playback intensity may be updated continuously as a video frame is used by more users.

Next, in step S200, at least one "selected video frame" is selected from the video on the basis of the degree of playback intensity of each video frame in the video. Here, the "selected video frame" refers to a video frame that is selected from the original video and to be put in a video frame set.

Here, the "degree of playback intensity" of the video frame is a ratio between the number of times that the video frame is played back and the number of times that the video where the video frame locates is played back.

When the video is played back, the user may instruct it to fast forward, jump, or end early, and not all the video frames are necessarily played back. Therefore, some video frames are played back more frequently, and some video frames are played back less frequently. By compiling statistics on behaviors of a large number of users, video frames that users are more interested in may be determined. Therefore, the "selected video frame" is selected on the basis of the degree of playback intensity of each video frame, and it is more likely to select content that users are more interested in.

Statistics on the degree of playback intensity of the video frame may be compiled by the video provider, and may also be compiled by an entrusted specialized research company or another institution, and the degree of playback intensity may also be directly acquired from another database.

Finally, after the "selected video frame" is selected, in step S400, the "selected video frames" are spliced to form a video frame set.

When the "selected video frames" are spliced, they may be spliced sequentially according to a playback sequence of the "selected video frames" in the original video.

The "selected video frames" may also be spliced sequentially according to the degrees of playback intensity thereof from high to low. In this way, the user possibly views content to which more users pay attention.

By considering the degrees of playback intensity of the video frames when the "selected video frames" are selected, video frames viewed by more users may be selected, thus more possibly selecting contents that are more favored by a majority of users.

Figure 2:
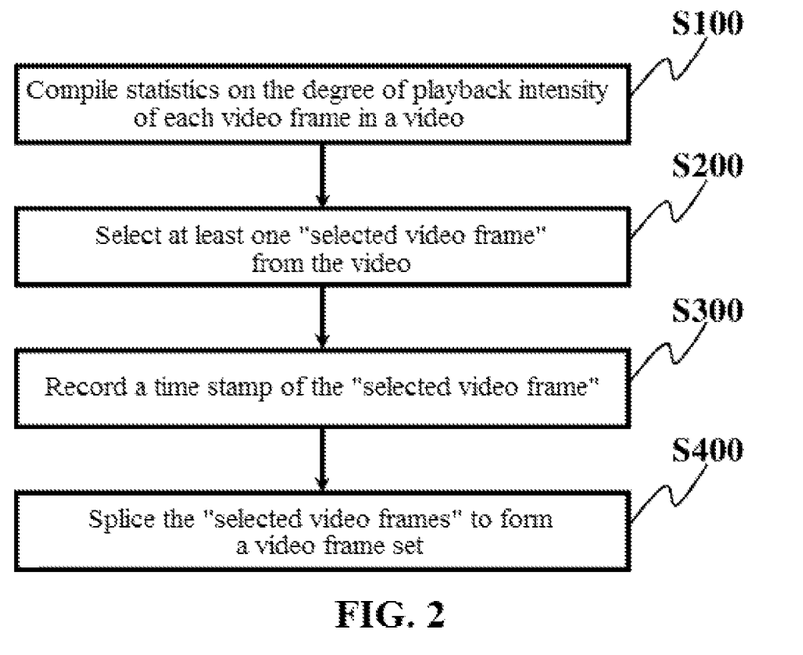
FIG. 2 is a flow chart of a method for producing a video frame set according to a second embodiment of the present invention.

FIG. 2 is a flow chart of a method for producing a video frame set according to a second embodiment of the present invention.

Compared with the method shown in FIG. 1, the method shown in FIG. 2 has one additional step, step S300, and for details of other steps, a reference is made to FIG. 1, which is not repeated herein.

In step S100 of the method shown in FIG. 2, statistics is compiled on the degree of playback intensity of each video frame in a video, and for the process of compiling statistics, a reference may be made to the above description, and is not repeated herein.

The degree of playback intensity may be updated continuously as a video frame is used by more users.

The method may perform subsequent steps after statistics on enough user's use records has been compiled. The subsequent steps may also be performed after statistics on a certain number of user's use records has been compiled, to select the "selected video frames" and form the video frame set; then, after statistics on a certain number of user's use records has been further compiled, a new degree of playback intensity is used, to reselect the "selected video frames" to form a new video frame set, thus continuously optimizing content of the video frame set.

Then, as described above with reference to FIG. 1, in step S200, at least one "selected video frame" is selected from the video on the basis of the degree of playback intensity of each video frame in the video on which statistics is compiled.

Then, in step S300, a time stamp of each "selected video frame" in the original video may be further recorded. In this way, when the video frame set is played back, the position of a video frame, which is being played back, in the corresponding original video may be easily found. When a user watches the video frame set and views content that the user is interested in, the user may conveniently enter the corresponding position of the original video from the place that the user is interested in, to start normal watching.

Time stamps of all video frames may be recorded in advance, and each video frame is corresponding to its time stamp. In this way, it is not necessary to specially record the time stamp of the "selected video frame", as long as a time stamp of a video frame, which is designated when the video frame set is watched, in the original video can be determined such that the video position of the video frame in the original video can be determined.

Definitely, it is also feasible that after the "selected video frame" is selected in step S200, a time stamp of the "selected video frame" and an identification code of the "selected video frame" are recorded specially.

In step S400, like the description with reference to FIG. 1, these "selected video frames" are spliced to form a video frame set.

In other words, after the "selected video frame" is selected, in step S400, the "selected video frames" are spliced to form a video frame set.

When the "selected video frames" are spliced, they may be spliced sequentially according to a playback sequence of the "selected video frames" in the original video.

The "selected video frames" may also be spliced sequentially according to the degrees of playback intensity thereof from high to low. In this way, the user possibly views content to which more users pay attention.

In the embodiment of the present invention, by considering the degrees of playback intensity of the video frames when the "selected video frames" are selected, video frames viewed by more users may be selected, thus more possibly selecting contents that are more favored by a majority of users.

It should be noted that, the sequence of performing step S400 and step S300 may be reversed, and the two steps may also be performed simultaneously.

Hereinafter, step S200 in FIG. 1 and FIG. 2 is further described.

In step S200, the degrees of playback intensity of the video frames may be sorted. Then, the first predetermined number of video frames having the maximum degrees of playback intensity are directly selected as the "selected video frames". The predetermined number may be determined as desired.

In this way, the "selected video frames" are several video frames having the maximum number of times that the video frames are played back by users, and easily embody video frames to which the users pay attention.

However, the predetermined number of video frames having the maximum number of times that the video frames are played back may be in consecutive video segments, and in this way, the video frame set may not reflect more content of the video.

In addition, it is also possible that some video frames are played back when users fast forward the video, statistics on the number of times that the video frames are played back is compiled as more, but actually, video frames before and after them are not played back, and they are not video frames to which the users really pay attention.

To overcome the above problem, a concept of "intensively played-back video segment" is further proposed here.

The method of step S200, which is described above with reference to FIG. 1 and FIG. 2, being performed with the help of the intensively played-back video segment is further described below with reference to FIG. 3 to FIG. 5.

Figure 3:
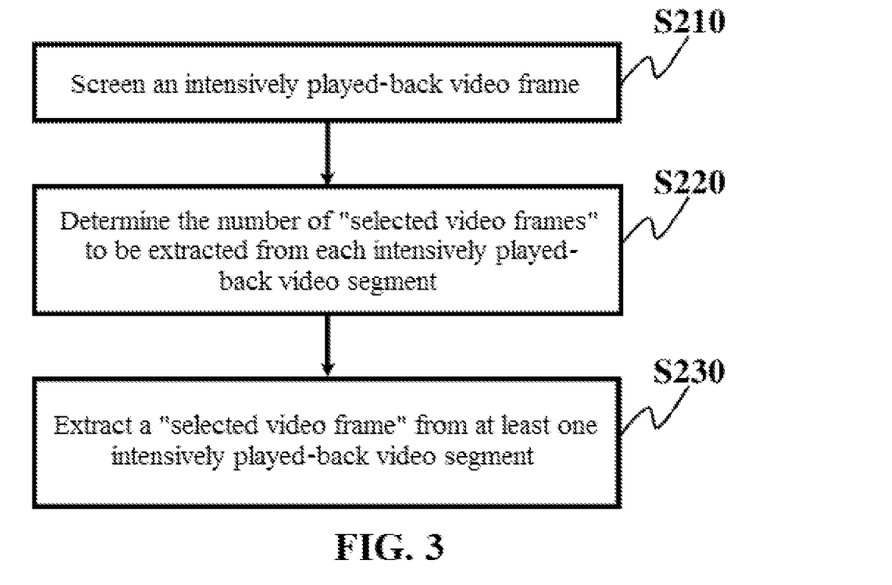
FIG. 3 is a flow chart of an implementation of step S200 in FIG. 1 and FIG. 2.

FIG. 3 is a flow chart of an implementation of step S200 in FIG. 1 and FIG. 2.

First, in step S210, a video frame of which the degree of playback intensity is greater than a predetermined threshold is screened from the video, and the video frame is herein referred to as an "intensively played-back video frame".

Here, the predetermined threshold may be a same value designated for all videos in advance, for example, 60%.

The predetermined threshold may also vary for different videos.

In addition, the predetermined threshold may also be determined according to an actual playback situation of each video frame in the video. For example, it may be set as a certain proportion of the maximum degree of playback intensity, for example, a half, two thirds or the like of the maximum degree of playback intensity.

There may be some consecutive intensively played-back video frames in the intensively played-back video segment screened in this manner, and these consecutive intensively played-back video frames form a video segment, which is referred to as an "intensively played-back video segment". Whether multiple video frames are consecutive may be determined according to time stamps thereof. When a video frame is not connected to other video frames, it may also be considered that the video frame separately forms a video segment, and this video segment has only one video frame.

In this way, the multiple intensively played-back video frames screened may form at least one intensively played-back video segment.

Then, in step S220, the number of "selected video frames" to be extracted from each intensively played-back video segment is determined. This step is optional.

Then, in step S230, a "selected video frame" is extracted from the at least one intensively played-back video segment.

In step S230, when the "selected video frame" is extracted from the intensively played-back video segment, the "selected video frame" may be extracted randomly from the intensively played-back video segment; or the first several video frames having the maximum degrees of intensity in the intensively played-back video segments may be extracted as "selected video frames".

In addition, in step S230, the "selected video frames" extracted from each intensively played-back video segment may be consecutive or non-consecutive. If consecutive "selected video frames" are extracted, a small video segment relatively consecutive may be presented to users.

The specific number of extracted video frames may be or may not be determined through the step S220.

FIG. 3 shows the situation including the step of determining the number of "selected video frames" to be extracted from each intensively played-back video segment.

However, step S220 may not be performed, instead, the number of "selected video frames" to be extracted from each video frame is specified in advance in step S230.

For example, it may be specified that a same number of (a predetermined number of) video frames are extracted from each intensively played-back video segment, for example, 5 video frames are extracted from each intensively played-back video segment.

Alternatively, for example, when the predetermined threshold set in step S210 is relatively high, it is possible that there are relatively few intensively played-back video frames screened, and therefore, it is also possible that all video frames are extracted from each intensively played-back video segment.

In this way, the step S220 is not necessary, and a specified number of "selected video frames" are extracted directly in step S230.

However, through step S220, the number of video frames to be extracted from each intensively played-back video segment is determined according to the statistical situation of actual video playback, so that the video frames can better reflect the perspective of users.

Hereinafter, two manners of determining the number of to-be-extracted video frames are described with reference to FIG. 4 and FIG. 5.

Figure 4:
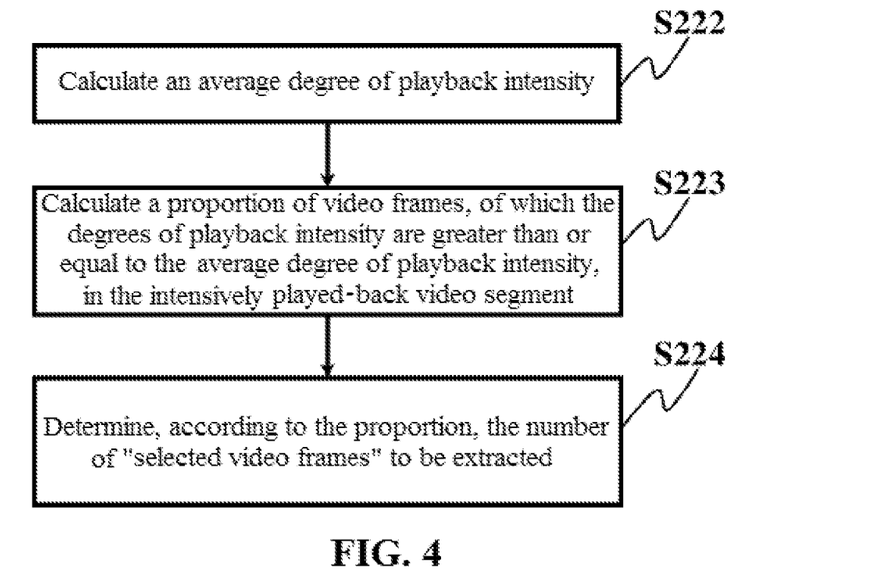
FIG. 4 is a flow chart of an implementation of step S220 in FIG. 3.

FIG. 4 is a flow chart of an implementation of step S220 in FIG. 3.

In the implementation shown in FIG. 4, the number of video frames to be extracted from an intensively played-back video segment is determined according to the distribution situation of the degrees of playback intensity of video frames in the intensively played-back video segment.

In step S222, an average degree of playback intensity of all video frames in each intensively played-back video segment is calculated.

Then, in step S223, a proportion of video frames, of which the degrees of playback intensity are greater than or equal to the average degree of playback intensity, in each intensively played-back video segment is calculated.

When this proportion is relatively small, it indicates that there may be only several videos in this video segment being played back multiple times due to some occasional factors such as fast forward. Therefore, it may be considered that the importance of the video segment is somewhat low, and fewer video frames may be extracted from the video segment.

In contrast, when the proportion is large, it indicates that video frames in this video segment may be widely cared about. Therefore, it may be considered that the importance of the video segment is somewhat high, and more video frames may be extracted from the video segment.

Then, in step S224, the number of "selected video frames" to be extracted from each intensively played-back video segment may be determined according to the proportion calculated in step S223.

Specifically, more "selected video frames" are extracted from the intensively played-back video segment having a larger proportion and fewer "selected video frames" are extracted from the intensively played-back video segment having a smaller proportion.

The number of the extracted "selected video frames" may be reduced gradually according to an order of the proportion from high to low (or from large to small).

For example, the proportion of a video segment 1 is the highest, being 90%, the proportion of a video segment 2 is the second highest, being 80%, . . . , then, 5 frames are extracted from the video segment 1, and 4 frames are extracted from the video segment 2, . . . .

As described above, in an intensively played-back video segment, consecutive frames may be extracted, or non-consecutive frames may be extracted; frames may be extracted randomly, or several frames having the maximum degrees of playback intensity may be extracted.

When the number of frames to be extracted is determined by using the manner shown in FIG. 4, there may be such a situation that the number of actual video frames in an intensively played-back video segment is less than the number of "selected video frames" to be extracted from the intensively played-back video segment that is determined according to the proportion. At this point, all video frames in the intensively played-back video segment may be extracted. All video frames are used as the number of the extracted "selected video frames".

In other words, when the number of actual video frames in each intensively played-back video segment is less than the number of the extracted selected video frames, all video frames in the intensively played-back video segment are extracted, and all the video frames are used as the number of the extracted selected video frames; or when the number of actual video frames in each intensively played-back video segment is greater than or equal to the number of the extracted selected video frames, consecutive frames in each intensively played-back video segment are extracted randomly, and the consecutive frames are used as the number of the extracted selected video frames.

Figure 5:
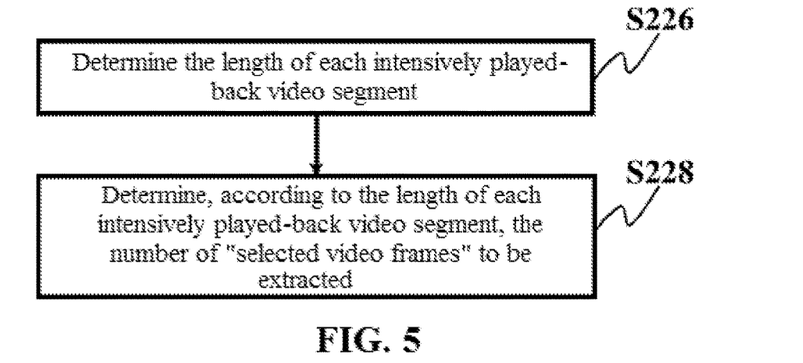
FIG. 5 is a flow chart of another implementation of step S220 in FIG. 3.

FIG. 5 is a flow chart of another implementation of step S220 in FIG. 3.

In the implementation shown in FIG. 5, the number of video frames to be extracted from an intensively played-back video segment is determined according to the length of the intensively played-back video segment (that is, the number of video frames).

First, in step S226, the length of each intensively played-back video segment is determined. Here, the length of the intensively played-back video segment may be indicated by using the number of video frames included in the intensively played-back video segment.

Then, in step S228, the number of "selected video frames" to be extracted from each intensively played-back video segment may be determined according to the length of the intensively played-back video segment.

More "selected video frames" are extracted from an intensively played-back video segment having a longer length and fewer "selected video frames" are extracted from an intensively played-back video segment having a shorter length.

The number of the extracted "selected video frames" may be reduced gradually according to an order of the length of the intensively played-back video segment from large to small (or from long to short).

For example, 5 frames are extracted from the longest intensively played-back video segment, and 4 frames are extracted from the second longest intensively played-back video segment, . . . .

Likewise, in an intensively played-back video segment, consecutive frames may be extracted, or non-consecutive frames may be extracted; frames may be extracted randomly, or several frames having the maximum degrees of playback intensity may be extracted.

The above, with reference to FIG. 4 and FIG. 5, describes two manners that may be used for determining the number of "selected video frames" to be extracted from each intensively played-back video segment in step S220.

In the case that the number of to-be-extracted "selected video frames" is determined through step S220, it may be considered that the video segment from which more "selected video frames" are selected is one to which the users pay more attention.

Therefore, "selected video frames" extracted from the intensively played-back video segment in which more "selected video frames" are extracted may be arranged before "selected video frames" extracted from the intensively played-back video segment in which fewer "selected video frames" are extracted. Therefore, content to which the users may pay more attention is placed in the front of the video frame set.

In this way, although the user does not view the video content of each "selected video frame" according to the order thereof in the original video when the user views the video frame set, it is possible that the user can view earlier video content of "selected video frames" to which the majority of users pay more attention.

On the other hand, the splicing the selected video frames to form the video frame set includes: arranging the extracted selected video frames gradually according to the number thereof from more to less; wherein, the "selected video frames" in a same intensively played-back video segment may be arranged according to a playback time sequence thereof in the video, and in this way, the sequence of time of video content in the same video segment may be ensured.

Optionally, in another embodiment, the extracting selected video frames from at least one intensively played-back video segment includes: extracting a predetermined number of video frames from each intensively played-back video segment; or extracting all video frames from each intensively played-back video segment.

Optionally, in another embodiment, the extracting selected video frames from at least one intensively played-back video segment includes: extracting selected video frames randomly from each intensively played-back video segment; or extracting several video frames before a video frame having the maximum degree of intensity in the intensively played-back video segments as the selected video frames.

A device for producing a video frame set according to the present invention is described in detail below with reference to FIG. 6 to FIG. 10, and the device may be used for performing the method for producing a video frame set described above with reference to FIG. 1 to FIG. 5.

In the following, a major structure of the device is mainly described, and specific operation details thereof can be completely identical to those described in the foregoing. Descriptions of some details are omitted to avoid repetition.

Figure 6:
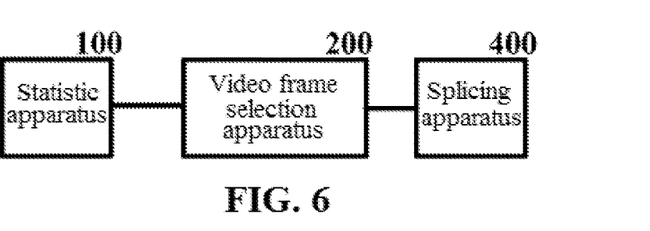
FIG. 6 is a block diagram of a device for producing a video frame set according to a third embodiment of the present invention.

FIG. 6 is a block diagram of a device for producing a video frame set according to a third embodiment of the present invention.

The device shown in FIG. 6 includes a statistic apparatus 100, a video frame selection apparatus 200, and a splicing apparatus 400.

The statistic apparatus 100 compiles statistics on the degree of playback intensity of each video frame in a video; and specifically includes: an information record apparatus configured to record playback information of each video; and a calculation apparatus configured to calculate the degree of playback intensity of each video frame in a video according to the playback information. For the specific implementation process thereof, reference may be made to the above descriptions, and is not repeated herein.

The video frame selection apparatus 200 selects at least one "selected video frame" from the video on the basis of the degree of playback intensity of each video frame in the video. As described above, the degree of playback intensity of the video frame is a ratio between the number of times that the video frame is played back and the number of times the video is played back. The video frame selection apparatus 200 may select the "selected video frame" in the same manner as the content described above with reference to FIG. 1 to FIG. 5.

The splicing apparatus 400 splices the "selected video frames" selected by the video frame selection apparatus 200 to form a video frame set. The splicing apparatus 400 may splice the "selected video frames" in the same manner as the content described above with reference to FIG. 1 to FIG. 5.

Figure 7:
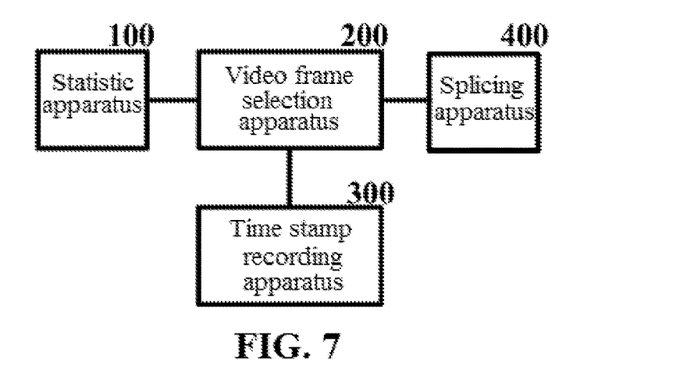
FIG. 7 is a block diagram of a device for producing a video frame set according to a fourth embodiment of the present invention.

FIG. 7 is a block diagram of a device for producing a video frame set according to a fourth embodiment of the present invention.

Compared with FIG. 6, the device shown in FIG. 7 has a time stamp record apparatus 300 added therein.

The time stamp record apparatus 300 records a time stamp of the "selected video frame" in the video.

Figure 8:
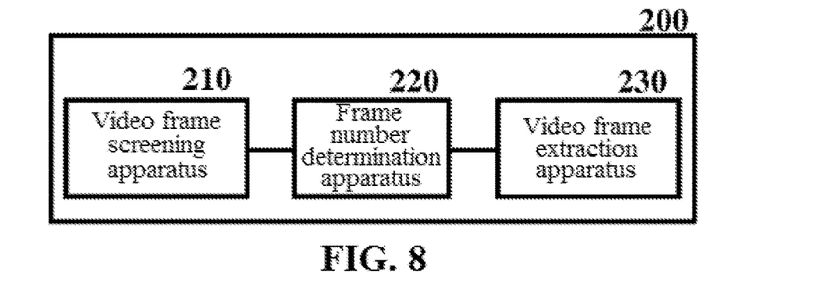
FIG. 8 is a block diagram of a sub-apparatus that can be included in a video frame selection apparatus 200 in FIG. 6 and FIG. 7.

FIG. 8 is a block diagram of a sub-apparatus that can be included in the video frame selection apparatus 200 in FIG. 6 and FIG. 7.

As shown in FIG. 8, the video frame selection apparatus 200 may include a video frame screening apparatus 210, a frame number determination apparatus 220, and a video frame extraction apparatus 230. Definitely, it is possible that only the video frame screening apparatus 200 and the video frame extraction apparatus 230 (not shown) are included, that is, the number of "selected video frames" extracted needs to be limited to limit the size of video highlights.

The video frame screening apparatus 210 screens an intensively played-back video frame of which the degree of playback intensity is greater than a predetermined threshold. Consecutive intensively played-back video frames form an intensively played-back video segment, and the intensively played-back video frames screened form at least one intensively played-back video segment.

The frame number determination apparatus 220 determines the number of "selected video frames" to be extracted from each intensively played-back video segment.

The video frame extraction apparatus 230 extracts "selected video frames" from the at least one intensively played-back video segment.

The frame number determination apparatus 220 is not necessary according to the reason identical to that in the description of the method according to the present invention. The number of frames to be extracted from each intensively played-back video segment may be specified in advance, for example, a predetermined number of video frames are extracted, or all video frames are extracted.

When the frame number determination apparatus 220 is used, the frame number determination apparatus 220 may be implemented in the following two manners.

Figure 9:
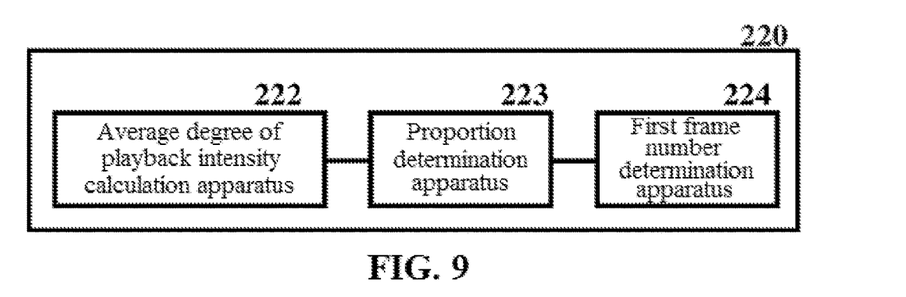
FIG. 9 is a block diagram of an implementation of a frame number determination apparatus 220 in FIG. 8.

FIG. 9 is a block diagram of an implementation of a frame number determination apparatus 220 in FIG. 8.

As shown in FIG. 9, the frame number determination apparatus 220 may include an average degree of playback intensity calculation apparatus 222, a proportion calculation apparatus 223, and a first frame number determination apparatus 224.

The average degree of playback intensity calculation apparatus 222 calculates an average degree of playback intensity of all video frames in each intensively played-back video segment.

The proportion calculation apparatus 223 calculates a proportion of video frames, of which the degrees of playback intensity are greater than the average degree of playback intensity, in each intensively played-back video segment.

The first frame number determination apparatus 224 is configured to determine, according to the proportion, the number of "selected video frames" to be extracted from each intensively played-back video segment.

Optionally, the first frame number determination apparatus is specifically configured to gradually reduce, according to the proportion from large to small, the numbers of selected video frames extracted from each intensively played-back video segment. In other words, more "selected video frames" are extracted from the intensively played-back video segment having a larger proportion and fewer "selected video frames" are extracted from the intensively played-back video segment having a smaller proportion.

When the number of actual video frames in the intensively played-back video segment is less than the number of "selected video frames" determined to be extracted from the intensively played-back video segment, all video frames in the intensively played-back video segment are extracted, and all the video frames are used as the number of the selected video frames extracted; or, when the number of actual video frames in each intensively played-back video segment is greater than or equal to the number of the extracted selected video frames, each of the video frames is extracted randomly.

Figure 10:
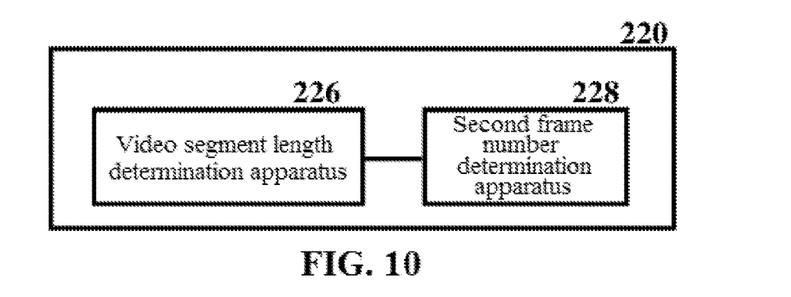
FIG. 10 is a block diagram of another implementation of a frame number determination apparatus 220 in FIG. 8.

FIG. 10 is a block diagram of another implementation of a frame number determination apparatus 220 in FIG. 8.

As shown in FIG. 10, the frame number determination apparatus 220 may include a video segment length determination apparatus 226 and a second frame number determination apparatus 228.

The video segment length determination apparatus 226 determines the length of each intensively played-back video segment, that is, the number of video frames included in each intensively played-back video segment.

The second frame number determination apparatus 228 determines, according to the length of the intensively played-back video segment, the number of selected video frames to be extracted from each intensively played-back video segment.

Specifically, the second frame number determination apparatus 228 gradually reduces, according to the length of each intensively played-back video segment from long to short, the number of selected video frames extracted from each intensively played-back video segment.

More "selected video frames" are extracted from an intensively played-back video segment having a longer length and fewer "selected video frames" are extracted from an intensively played-back video segment having a shorter length. In other words, when the number of actual video frames in each intensively played-back video segment is less than the number of selected video frames extracted, all video frames in the intensively played-back video segment are extracted, and all the video frames are used as the number of the selected video frames extracted; or, when the number of actual video frames in each intensively played-back video segment is greater than or equal to the number of the selected video frames extracted, consecutive frames of each intensively played-back video segment are extracted randomly, and the consecutive frames are used as the number of the selected video frames extracted.

So far, specific embodiments of the method and device for producing a video frame set according to the present invention have been described in detail. However, those skilled in the art should understand that the present invention is not limited to various details described herein, but adequate modifications may be made. The protection scope of the present invention is defined by the appended claims.

Correspondingly, the embodiments of the present invention further provide a server, including: a transceiver and a processor, wherein the transceiver is configured to compile statistics on a degree of playback intensity of each video frame in a video; and the processor is configured to select at least one selected video frame from the video on a basis of the degree of playback intensity, where the degree of playback intensity of the video frame is a ratio between the number of times that the video frames are played back and the number of times the video is played back; and splice the selected video frames to form a video frame set.

Selecting, by the processor, at least one selected video frame from the video includes: screening intensively played-back video frames of which the degrees of playback intensity are greater than a predetermined threshold, and forming at least one intensively played-back video segment with the screened intensively played-back video frames; and extracting a selected video frame from the at least one intensively played-back video segment; where, consecutive intensively played-back video frames form an intensively played-back video segment.

Selecting, by the processor, at least one selected video frame from the video further includes: determining the number of selected video frames extracted from each intensively played-back video segment.

Determining, by the processor, the number of selected video frames extracted from each intensively played-back video segment includes: calculating an average degree of playback intensity of all video frames in each intensively played-back video segment; calculating a proportion of video frames, of which the degrees of playback intensity are greater than or equal to the average degree of playback intensity, in each intensively played-back video segment; and determining, according to the proportion, the number of selected video frames extracted from each intensively played-back video segment.

Determining, by the processor, according to the proportion, the number of selected video frames extracted from each intensively played-back video segment includes: gradually reducing, according to the proportion from large to small, the number of selected video frames extracted from each intensively played-back video segment.

Determining, by the processor, the number of selected video frames extracted from each intensively played-back video segment includes: determining the length of each intensively played-back video segment; and determining, according to the length of each intensively played-back video segment, the number of selected video frames extracted from each intensively played-back video segment.

Determining, by the processor, according to the length of each intensively played-back video segment, the number of selected video frames extracted from each intensively played-back video segment includes: gradually reducing, according to the length of each intensively played-back video segment from long to short, the number of selected video frames extracted from each intensively played-back video segment.

Figure 11:
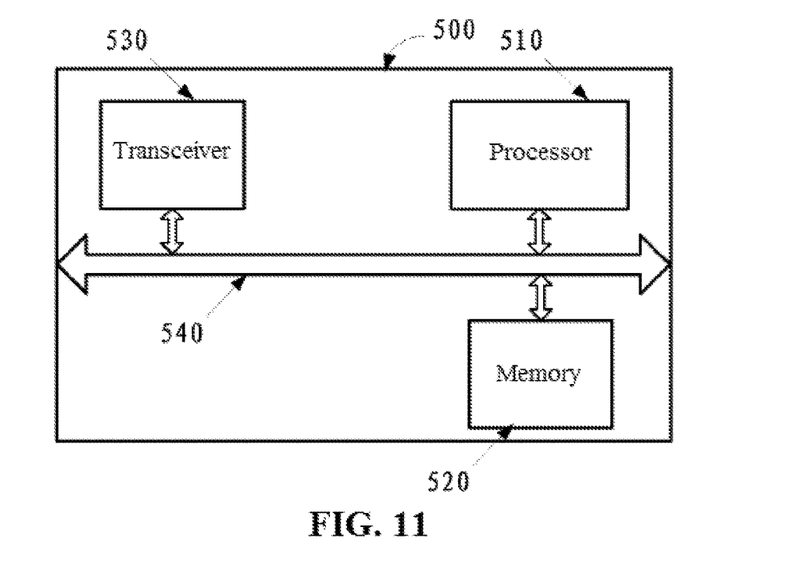
FIG. 11 is a schematic structural diagram of a server according to an embodiment of the present invention.

Referring to FIG. 11, a schematic structural diagram of an application instance of a server provided by the embodiment of the present invention is shown. The terminal 500 includes: a processor 510, a memory 520, a transceiver 530, and a bus 540.

The processor 510, the memory 520, and the transceiver 530 are connected to one another through the bus 540; and the bus 540 may be an ISA bus, a PCI bus, an EISA bus, or the like. The bus may be classified into an address bus, a data bus, a control bus, and the like. For ease of expression, the bus is expressed only by a bold line in FIG. 5, but it does not mean that there is only one bus or one type of bus.

The memory 520 is configured to store a program. Specifically, the program may include a program code, and the program code includes a computer operation instruction. The memory 520 may include a high-speed RAM memory, and may also include a non-volatile memory, for example, at least one magnetic disk memory.

The transceiver 530 is configured to compile statistics on the degree of playback intensity of each video frame in a video;

the processor 510 executes the program code stored in the memory 520, to select at least one selected video frame from the video on the basis of the degree of playback intensity, where the degree of playback intensity of the video frame is a ratio between the number of times that the video frame is played back and the number of times the video is played back; and splice the selected video frames to form a video frame set.

Optionally, selecting, by the processor 510, at least one selected video frame from the video includes: screening intensively played-back video frames of which the degrees of playback intensity are greater than a predetermined threshold, and forming at least one intensively played-back video segment with the screened intensively played-back video frames; and extracting a selected video frame from the at least one intensively played-back video segment; where, consecutive intensively played-back video frames form an intensively played-back video segment.

Optionally, selecting, by the processor 510, at least one selected video frame from the video may further include: determining the number of selected video frames extracted from each intensively played-back video segment.

Optionally, determining, by the processor 510, the number of selected video frames extracted from each intensively played-back video segment includes: calculating an average degree of playback intensity of all video frames in each intensively played-back video segment; calculating a proportion of video frames, of which the degrees of playback intensity are greater than or equal to the average degree of playback intensity, in each intensively played-back video segment; and determining, according to the proportion, the number of selected video frames extracted from each intensively played-back video segment.

Optionally, determining, by the processor 510, according to the proportion, the number of selected video frames extracted from each intensively played-back video segment includes: gradually reducing, according to the proportion from large to small, the number of selected video frames extracted from each intensively played-back video segment.

Optionally, determining, by the processor 510, the number of selected video frames extracted from each intensively played-back video segment includes: determining the length of each intensively played-back video segment; and determining, according to the length of each intensively played-back video segment, the number of selected video frames extracted from each intensively played-back video segment.

Optionally, determining, by the processor 510, according to the length of each intensively played-back video segment, the number of selected video frames extracted from each intensively played-back video segment includes: gradually reducing, according to the length of the intensively played-back video segment from long to short, the number of selected video frames extracted from each intensively played-back video segment.

Optionally, the processor 510 is further configured to, when the number of actual video frames in each intensively played-back video segment is less than the number of selected video frames extracted, extract all video frames in the intensively played-back video segment, and use all the video frames as the number of the selected video frames extracted; or, when the number of actual video frames in each intensively played-back video segment is greater than or equal to the number of the selected video frames extracted, extract consecutive frames of each intensively played-back video segment randomly, and use the successive frames as the number of the selected video frames extracted.

Optionally, splicing, by the processor 510, the selected video frames to form the video frame set, includes: arranging the extracted selected video frames gradually according to the number thereof from more to less; where, the selected video frames in a same intensively played-back video segment are arranged according to a playback time sequence thereof in the video.

Optionally, extracting, by the processor 510, selected video frames from at least one intensively played-back video segment includes: extracting a predetermined number of video frames from each intensively played-back video segment; or extracting all video frames from each intensively played-back video segment.

Optionally, extracting, by the processor 510, selected video frames from at least one intensively played-back video segment includes: extracting selected video frames randomly from each intensively played-back video segment; or extracting several video frames before a video frame having the maximum degree of intensity in each intensively played-back video segment as selected video frames.

Optionally, selecting, by the processor 510, at least one selected video frame from the video includes: selecting the first predetermined number of video frames among the video frames having the maximum degrees of playback intensity as selected video frames.

Optionally, the splicing, by the processor 510, the selected video frames to form the video frame set includes: sequentially splicing the selected video frames according to a playback time sequence of the selected video frames in the video, to form the video frame set.

For implementation processes of the functions and effects of the transceiver and the processor in the server, reference may be made to the implementation processes of corresponding parts in the above method embodiments, which is not repeated herein.

In a specific implementation, the processor may be a central processing unit (CPU), an application-specific integrated circuit (ASIC), and the like. The computer storage medium may have a program stored therein, and when the program is executed, a part of or all steps of the embodiments of producing a video frame set provided in the embodiments of the present invention may be included. The storage medium may be a magnetic disk, an optical disc, a Read-Only Memory (ROM), a Random Access Memory (RAM), and the like.

Those of ordinary skill in the art may be aware that, in combination with the examples described in the embodiments disclosed herein, units and algorithm steps may be implemented by electronic hardware, or a combination of computer software and electronic hardware. Whether the functions are performed in a hardware or software manner depends on particular applications and design constraint conditions of the technical solutions. Those skilled in the art may implement the described functions by using different methods for each specific application; however, this implementation should not be considered as exceeding the scope of the present invention.

Those skilled in the art can clearly know that, for ease and clarity of descriptions, specific working processes of the apparatus and the server described in the above may be obtained with reference to corresponding processes in the foregoing method embodiments, and are not repeated herein.

In the several embodiments provided in the present application, it should be understood that the disclosed system, apparatus and method may be implemented in other manners. For example, the apparatus embodiment described in the foregoing is merely schematic, for example, the division of units is merely division of logic functions, and there may be other division manners during actual implementation, for example, multiple units or components may be combined or may be integrated into another system, or some features may be omitted or not be executed. On the other hand, the displayed or discussed coupling or direct coupling or communication connection between them may be implemented through indirect coupling or communication connection between some interfaces, apparatuses or units, and may be in the form of electrical, mechanical or other forms.

Units described as separated parts may be or may not be physically separated, parts displayed as units may be or may not be physical units, and they may be located at the same place, or be distributed to multiple network units. The objective of the solution of this embodiment may be implemented by selecting a part of or all units thereof according to actual requirements.

If the function is implemented in a form of a software function unit and sold or used as an independent product, it may be stored in a computer readable storage medium. The computer readable storage medium includes a computer execution instruction, such that the processor performs steps of any of the above methods for producing a video frame set when a processor of the computer executes the computer execution instruction. Based on such an understanding, the technical solutions of the present invention essentially, or the part contributing to the prior art, or a part of the technical solution may be implemented in a form of a software product. The computer software product may be stored in a storage medium, and includes several instructions for instructing a computer device (which may be a personal computer, a server, or a network device) or a processor to execute all or a part of steps in the methods described in the embodiments of the present invention. The storage medium includes: a USB flash disk, a mobile hard disk, a Read-Only Memory (ROM), a Random Access Memory (RAM), a magnetic disk, an optical disc, or other media that can store program codes.

The above descriptions are merely specific implementation manners of the present invention, but the protection scope of the present invention is not limited thereto. Variations or replacements that can be easily derived by persons skilled in the art without departing from the technical scope disclosed in the present invention shall fall within the protection scope of the present invention. Therefore, the protection scope of the present invention shall be subject to the protection scope of the claims.

The invention claimed is:

1. A method for producing a video frame set, comprising: compiling statistics on a degree of playback intensity of each video frame in a video; selecting at least one intensively played-back video frame from the video on the basis of the degree of playback intensity, wherein the degree of playback intensity of the video frame is a ratio between the number of times that the video frame is played back and the number of times the video is played back, wherein selecting the at least one intensively played-back video frame from the video on the basis of the degree of playback intensity comprises: screening out video frames which have degrees of playback intensity greater than a predetermined threshold, wherein among the screened-out video frames, if multiple video frames are consecutive, the multiple video frames are considered as an intensively played-back video segment, and if a video frame is not consecutive with any other video frames, the video frame is considered as a separated video segment; and extracting at least one video frame from at least one intensively played-back video segment or separated video segment as selected video frames; and splicing the selected video frames to form the video frame set.

2. The method according to claim 1, wherein the step of selecting the at least one intensively played-back video frame from the video further comprises: determining the number of selected video frames extracted from each intensively played-back video segment.

3. The method according to claim 2, wherein the step of determining the number of selected video frames extracted from each intensively played-back video segment comprises:
calculating an average degree of playback intensity of all video frames in each intensively played-back video segment;
calculating a proportion of video frames, of which the degrees of playback intensity are greater than or equal to the average degree of playback intensity, in each intensively played-back video segment; and
determining, according to the proportion, the number of selected video frames extracted from each intensively played-back video segment.

4. The method according to claim 3, wherein the step of determining, according to the proportion, the number of selected video frames extracted from each intensively played-back video segment comprises:
gradually reducing, according to the proportion from large to small, the number of selected video frames extracted from each intensively played-back video segment.

5. The method according to claim 2, wherein the step of determining the number of selected video frames extracted from each intensively played-back video segment comprises:
determining the length of each intensively played-back video segment; and
determining, according to the length of each intensively played-back video segment, the number of selected video frames extracted from each intensively played-back video segment.

6. The method according to claim 5, wherein the step of determining, according to the length of each intensively played-back video segment, the number of selected video frames extracted from each intensively played-back video segment comprises:
gradually reducing, according to the length of each intensively played-back video segment from long to short, the number of selected video frames extracted from each intensively played-back video segment.

7. The method according to claim 4, further comprising:
when the number of actual video frames in each intensively played-back video segment is less than the number of the extracted selected video frames, extracting all video frames in the intensively played-back video segment, and using all the video frames as the number of the extracted selected video frames; and
when the number of actual video frames in each intensively played-back video segment is greater than or equal to the number of the extracted selected video frames, randomly extracting consecutive frames in each intensively played-back video segment, and using the consecutive frames as the number of the extracted selected video frames.

8. The method according to claim 2, wherein the step of splicing the selected video frames to form the video frame set comprises:
arranging the extracted selected video frames gradually according to the number thereof from more to less; wherein
the selected video frames in a same intensively played-back video segment are arranged according to a playback time sequence thereof in the video.

9. The method according to claim 1, wherein the step of extracting a selected video frame from the at least one intensively played-back video segment comprises: extracting a predetermined number of video frames from each intensively played-back video segment; or extracting all video frames from each intensively played-back video segment.

10. The method according to claim 1, wherein the step of extracting a selected video frame from the at least one intensively played-back video segment comprises: extracting selected video frame randomly from each intensively played-back video segment; or extracting several video frames before a video frame having the maximum degree of intensity in each intensively played-back video segment as selected video frames.

11. The method according to claim 1, wherein the step of selecting at least one intensively played-back video frame from the video comprises: selecting a first predetermined number of video frames among the video frames having the maximum degrees of playback intensity as the selected video frames.

12. The method according to claim 1, wherein the step of splicing the selected video frames to form the video frame set comprises:
sequentially splicing the selected video frames according to the playback time sequence of the selected video frames in the video, to form the video frame set.

13. A device for producing a video frame set, comprising: a statistic apparatus configured to compile statistics on a degree of playback intensity of each video frame in a video; a video frame selection apparatus configured to select at least one intensively played-back video frame from the video on a basis of the degree of playback intensity, wherein the degree of playback intensity of the video frame is a ratio between the number of times that the video frame is played back and the number of times the video is played back; a video frame screening apparatus configured to screen out video frames which have degrees of playback intensity greater than a predetermined threshold, wherein among the screened-out video frames, if multiple video frames are consecutive, the multiple video frames are considered as an intensively played-back video segment, and if a video frame is not consecutive with any other video frames, the video frame is considered as a separated video segment; and a video frame extraction apparatus configured to extract at least one video frame from at least one intensively played-back video segment or separated video segment video segment as selected video frames; and a splicing apparatus configured to splice the selected video frames to form the video frame set.

14. The device according to claim 13, wherein the video frame selection apparatus further comprises: a frame number determination apparatus configured to determine the number of selected video frames extracted from each intensively played-back video segment.

15. The device according to claim 14, wherein the frame number determination apparatus comprises:
an average degree of playback intensity calculation apparatus configured to calculate an average degree of playback intensity of all video frames in each intensively played-back video segment;
a proportion calculation apparatus configured to calculate a proportion of video frames, of which the degrees of playback intensity are greater than or equal to the average degree of playback intensity, in each intensively played-back video segment; and
a first frame number determination apparatus configured to determine, according to the proportion, the number of selected video frames extracted from each intensively played-back video segment.

16. The device according to claim 15, wherein the first frame number determination apparatus is specifically configured to gradually reduce, according to the proportion from large to small, the number of selected video frames extracted from each intensively played-back video segment.

17. The device according to claim 14, wherein the frame number determination apparatus comprises:
a video segment length determination apparatus configured to determine the length of each intensively played-back video segment; and
a second frame number determination apparatus configured to determine, according to the length of each intensively played-back video segment, the number of selected video frames extracted from each intensively played-back video segment.

18. The device according to claim 17, wherein the second frame number determination apparatus is specifically configured to gradually reduce, according to the length of each intensively played-back video segment from long to short, the number of selected video frames extracted from each intensively played-back video segment.

19. A server, comprising: a transceiver configured to compile statistics on a degree of playback intensity of each video frame in a video; and a processor configured to perform operations comprising: selecting at least one intensively played-back video frame from the video on a basis of the degree of playback intensity, wherein the degree of playback intensity of the video frame is a ratio between the number of times that the video frame is played back and the number of times the video is played back, wherein selecting the at least one intensively played-back video frame from the video on the basis of the degree of playback intensity comprises: screening out video frames which have degrees of playback intensity greater than a predetermined threshold, wherein among the screened-out video frames, if multiple video frames are consecutive, the multiple video frames are considered as an intensively played-back video segment, and if a video frame is not consecutive with any other video frames, the video frame is considered as a separated video segment; and extracting at least one video frame from at least one intensively played-back video segment or separated video segment as selected video frames; and splicing the selected video frames to form a video frame set.

20. The server according to claim 19, wherein selecting, by the processor, at least one intensively played-back video frame from the video further comprises: determining the number of selected video frames extracted from each intensively played-back video segment.

21. The server according to claim 20, wherein determining, by the processor, the number of selected video frames extracted from each intensively played-back video segment comprises: calculating an average degree of playback intensity of all video frames in each intensively played-back video segment; calculating a proportion of video frames, of which the degrees of playback intensity are greater than or equal to the average degree of playback intensity, in each intensively played-back video segment; and determining, according to the proportion, the number of selected video frames extracted from each intensively played-back video segment.

22. The server according to claim 21, wherein determining, by the processor, according to the proportion, the number of selected video frames extracted from each intensively played-back video segment comprises: gradually reducing, according to the proportion from large to small, the number of selected video frames extracted from each intensively played-back video segment.

23. The server according to claim 20, wherein determining, by the processor, the number of selected video frames extracted from each intensively played-back video segment comprises: determining the length of each intensively played-back video segment; and determining, according to the length of each intensively played-back video segment, the number of selected video frames extracted from each intensively played-back video segment.

24. The server according to claim 23, wherein determining, by the processor, according to the length of each intensively played-back video segment, the number of selected video frames extracted from each intensively played-back video segment comprises: gradually reducing, according to the length of each intensively played-back video segment from long to short, the number of selected video frames extracted from each intensively played-back video segment.

25. A non-transitory computer readable storage medium, comprising computer execution instructions, such that, when a processor of a computer executes the computer execution instructions, the computer performs a method for producing a video frame set comprising: compiling statistics on a degree of playback intensity of each video frame in a video; selecting at least one intensively played-back video frame from the video on the basis of the degree of playback intensity, wherein the degree of playback intensity of the video frame is a ratio between the number of times that the video frame is played back and the number of times the video is played back, wherein selecting the at least one intensively played-back video frame from the video on the basis of the degree of playback intensity comprises: screening out video frames which have degrees of playback intensity greater than a predetermined threshold, wherein among the screened-out video frames, if multiple video frames are consecutive, the multiple video frames are considered as an intensively played-back video segment, and if a video frame is not consecutive with any other video frames, the video frame is considered as a separated video segment; and extracting at least one video frame from at least one intensively played-back video segment or separated video segment as selected video frames; and splicing the selected video frames to form the video frame set.

\* \* \* \* \*